United States Patent Office 3,432,568
Patented Mar. 11, 1969

3,432,568
UPGRADING OF HYDROCARBONS IN THE PRESENCE OF A MIXED ALUMINO-SILICATE AND METAL CATALYST
Joseph N. Miale, Trenton, N.J., and Paul B. Weisz, Media, Pa., assignors to Mobil Oil Corporation, a corporation of New York
No Drawing. Filed June 20, 1966, Ser. No. 558,612
U.S. Cl. 260—676       3 Claims
Int. Cl. C07c 5/30

ABSTRACT OF THE DISCLOSURE

A process for low temperature hydroisomerization of saturated aliphatic and cyclic hydrocarbons by contacting the same with a mixed dual-functional catalyst comprising (1) hydrogen mordenite and (2) a dehydrogenation component supported on a thermally stable carrier.

---

This invention relates to the upgrading by isomerization of hydrocarbons in the presence of a mixed, crystalline aluminosilicate and metal, catalyst, and in particular the hydroisomerization of paraffinic and cyclic hydrocarbons to branched chain and cyclic isomers in the presence of these mixed catalysts.

Heretofore, it has been known that the isomerization of normal paraffins, particularly n-hexane, to their equilibrium mixtures of branched chain isomers, substantially increases the octane rating of the paraffinic hydrocarbons. In general, the octane rating of the equilibrium mixture is affected by the temperature at which the conversion is effected; the lower temperatures usually producing the higher octane rating. In attempting to produce such equilibrium mixtures of isoparaffinic hydrocarbons, several catalytic processes have been developed. Of these, two major processes are presently employed for the isomerization of normal paraffins. The lower temperature process effects isomerization over an aluminum chloride catalyst. The process is costly to operate because of extensive corrosive effects caused by the acidic sludge formed from the aluminum chloride catalyst material, thereby requiring expensive alloy equipment. Moreover, moisture and high molecular weight hydrocarbons usually present as contaminants in the charge stock cause deterioration of the catalyst and necessitate its frequent replacement. The higher temperature process utilizes a catalyst such as platinum on a silica-alumina base to promote hydroisomerization of normal paraffins in the presence of hydrogen at temperatures of the order of 700° to 800° F. At these high temperatures the equilibrium mixture of isomers is such that substantial recycling of a portion of the paraffin feed is necessary to obtain the desired improvement in octane ratings.

It is therefore an object of this invention to provide a process for hydroisomerization of paraffins which, while operating at low temperatures, will yield substantial increases in the octane rating of the paraffinic hydrocarbon. It is another object of this invention to provide a process that will not only be efficient but economical at the same time. These and other objects will flow from and become apparent from the following detailed description of the invention.

In accordance with this invention a process has now been found for low temperature hydroisomerization of hydrocarbons selected from saturated aliphatic and cyclic hydrocarbons which comprises contacting the same, at temperatures between about 300° and 600° F., with a mixed dual-functional catalyst comprising (1) hydrogen mordenite as the acidic component, and (2) a dehydrogenation component selected from the group consisting of oxides of metals, sulfides of metals, and metals of Group VI and VIII of the Periodic Table supported on a thermally stable carrier, in intimate physical admixture.

Selective isomerization of n-hexane has been found to be achieved at a temperature of 500° F. with mixtures of rare-earth exchanged crystalline aluminosilicates, prepared according to the method described in copending U.S. application S.N. 398,432, filed Sept. 22, 1964, now Patent 3,301,917, and Pt-alumina, in the presence of hydrogen, by what appears to be a normal dual-step reaction process. Similar mixtures with hydrogen mordenite have been found to be still more active and operate at process temperatures of 400 to 450° F. when compared under identical conditions.

For hydrogen mordenite, operating at lower temperatures its admixture with Pt-alumina, according to one embodiment of this invention, gave less total conversion than the hydrogen mordenite alone, indicating the possible existence of a phenomenon beyond the mechanism of dual-step catalysts. However, while total conversion was less, selectivity to isomerization was surprisingly quite high.

It is an essential and critical feature of this invention that the dehydrogenation component be admixed with the support material rather than with the acidic component, and further that thereafter the two components (supported dehydrogenation+acidic) be in intimate physical admixture, since it has been found that placing the dehydrogenation component on the acidic component causes large scale agglomeration of the former, sharply reducing the effectiveness of the conversion, and contacting the charge on the supported dehydrogenation component not in admixture with the acidic component causes virtual quenching of isomerization activity.

The crystalline aluminosilicates can be described as a three dimensional framework of SiO$_4$ and AlO$_4$ tetrahedra in which the tetrahedra are cross-linked by the sharing of oxygen atoms whereby the ratio of the total aluminum and silicon atoms to oxygen atoms is 1:2. In their hydrated form, the aluminosilicates may be represented by the formula:

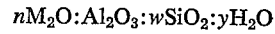
$$nM_2O:Al_2O_3:wSiO_2:yH_2O$$

wherein M is a cation which balances the electrovalence of the tetrahedra, $n$ represents the valence of the cation, $w$ the moles of SiO$_2$, and $y$ the moles of H$_2$O. The cation can be one or more of a number of metal ions depending on wether the aluminosilicate is synthesized or occurs naturally. Typical cations include sodium, lithium, potassium, calcium, and the like. Although the proportions of inorganic oxides in the silicates and their spatial arrangement may vary, effecting distinct properties in the aluminosilicates, the two main characteristics of these materials is the presence in their molecular structure of at least 0.5 equivalents of an ion of positive valence per gram atom of aluminum, and an ability to undergo dehydration without substantially affecting the SiO$_4$ and AlO$_4$ framework.

Advantageously, the crystalline aluminosilicate material found to be active in the present process is prepared from a naturally occurring zeolite known as mordenite. This zeolite has an ordered crystalline structure having a ratio of silicon atoms to aluminum atoms of about 5 tool. In its natural state it usually appears as the sodium salt which is represented by the following formula:

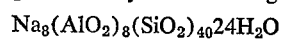
$$Na_8(AlO_2)_8(SiO_2)_{40}24H_2O$$

Mordenite's ordered crystalline structure is believed to be made up of chains of 5-membered rings of tetrahedra and its adsorbability suggests a parallel system of channels having free diameters on the order of 4 A. to 6.6 A., interconnected by smaller channels, parallel to another axis, on the order of 2.8 A. free diameters. As a result of this crystalline framework, mordenite can adsorb simple cyclic hydrocarbons, such as cyclopentane, cyclohexane, benzene and the like, simple branched-chain hydrocarbons, such as 2-methylpentane, as well as straight chain hydrocarbons.

The hydrogen form mordenite employed in the subject process is prepared by conventional techniques which include the exchange of mordenite with acid solution, or more commonly, and preferably, conversion of mordenite to the ammonium form via base exchange, with an ammonium salt, and calcination of the resultant ammonium-form mordenite to cause thermal degradation of the ammonium ions and formation of the desired hydrogen cationic sites.

Suitable dehydrogenation components for the mixed catalyst include one or more metals of Groups VI and VIII of the Periodic Table either in elemental form or in the form of the oxides or sulfides of these metals. Representative of these metals are molybdenum, chromium, tungsten, iron, cobalt, nickel, and metals of the platinum group, i.e., platinum, palladium, osmium, rhodium, ruthenium and iridium as well as combinations of these metals, their oxides or sulfides. Preferably, because of its high hydrogenation activity, platinum is employed alone.

The support for the dehydrogenation component may be selected from any suitable material exhibiting thermal stability under the reaction conditions employed herein. Thus various refractory oxides, including alumina, silica, zirconia, magnesia, thoria, titania and the like, and mixtures thereof may be suitably employed herein. Typical of these oxide mixtures are silica-alumina, silica-alumina-magnesia, silica-zirconia, and the like. Of the foregoing, alumina is preferably utilized. As mentioned above, other hydrous inorganic oxides, binders, or similar catalytic supports may also be utilized as a carrier for the hydrogenation component, with carbon, activated charcoal, bauxite, kieselguhr, and the like being non-limiting examples of such alternates. One requirement for such carrier is that it should have sufficient thermal stability to act as a support under the process reaction conditions.

The percentage by weight of dehydrogenation component on the carrier is generally very small in comparison with the proportion of other active ingredients found within the mixed catalyst. Thus, the amount of dehydrogenation component extends from about 0.05 to 4.0 percent by weight of the mixed catalyst; preferably the amount of metal is about 0.3 to 0.6 percent by weight. The metal and support therefore are preferably physically admixed by ball milling the desired amounts together.

It will be appreciated that these catalyst support carriers have effective surface areas ranging from about 50 to 500 square meters per gram. These carriers, especially those having the higher surface areas, support and distribute the relatively small amount of dehydrogenation metal so that it exhibits the hydrogenation activity requisite for the hydroisomerization process of this invention. In addition, the carrier also performs another important function for the mixed catalyst. It is believed that the use of a separate carrier for the dehydrogenation component permits the alumino-silicate portion of the mixed catalyst to have the high concentration of acid sites necessary for the isomerization reactions of this process. That is to say, the carrier makes the platinum type metal available to the paraffinic hydrocarbons. In this method such metal is offered without need for sacrificing a fraction of the total acidic cationic sites within the aluminosilicate. Furthermore, the availability of the acid sites for contact with the paraffinic hydrocarbons is also maintained because the platinum metal cannot accumulate within the ordered internal structure of the alumino-silicate and thereby block off or otherwise reduce the effective diameters of its internal pore structures. Indeed, as mentioned heretofore, it is a critical feature of this invention that the platinum type metal be in admixture with its support material.

The mixed catalyst employed in the process of this invention may be used in the form of small fragments of a size best suited for operation under the specific conditions existing. Thus, preferably, the catalyst is in granular form having a mesh size of about 12 to 25 (U.S. screen).

The relative proportions of the hydrogen mordenite within the mixed catalyst range from about 10 to 90 weight percent, and preferably 40 to 60 weight percent, with the understanding, however, that the amount of crystalline aluminosilicate will depend on its effective acidity, that is, the concentration of acid sites found within its ordered internal structure and their availability for contact with the paraffinic hydrocarbons. Likewise, the amount of dehydrogenation component will be governed by its effective dehydrogenation activity.

The hydrocarbons which can be hydroisomerized in accordance with the process of this invention, may contain from 5 to 40 carbon atoms per molecule. In general, the straight chain saturated hydrocarbons with 5 to 8 carbon atoms are converted to mixtures containing a major proportion of mono- and poly-branched chain isomers and only a minor proportion of lower molecular weight cracked products. For example, the hydroisomerization of n-hexane in the presence of hydrogen and the heretofore described mixed catalyst produces a mixture of isomers such as 2,2-dimethylbutane, 2,3-dimethylbutane, 2-methylpentane and 3-methylpentane, together with lower molecular weight paraffins, i.e., propane, isobutane, n-butane, isopentane, and the like. In addition, other hydrocarbons including branched-chain paraffinic and cyclic hydrocarbons such as 2-methylpentane, methylcyclopentane, methylcyclohexane, cyclopentane, cyclohexane, and the like, may be isomerized to compounds having a greater number of branched chains. As a result of the conversion from the straight chain to a branched chain configuration, the paraffinic hydrocarbons in the gasoline range, such as the n-hexanes, may increase their octane rating from about a leaded octane number of 65 to a leaded octane number above 90. As a result of the conversion from the straight chain to branch chain, the resulting isoparaffinic hydrocarbons in the $C_7$ to $C_{20}$ range subsequently find commercial use as special solvents as well as use in low pour-point diesel and jet fuels. Similarly, as a result of such conversion, the $C_{16}$–$C_{40}$ range isoparaffins have found utility as excellent synthetic lubricants. It will be appreciated that the extent of improvement in the products produced by the process of this invention, is dependent on the hydrocarbon being isomerized, as well as the particular operating conditions and specific mixed catalyst being employed.

In accordance with one embodiment of this invention, high conversion of paraffinic hydrocarbons to their corresponding mixture of isomers, can be obtained at relatively low operating temperatures and non-corrosive conditions. The temperatures of the process may extend from about 300° to about 600° F.; preferably the process operates at a temperature from about 300° to 500° F. In general, the choice of temperature is dependent upon the paraffin being isomerized. The higher molecular weight paraffins containing more than 8 carbon atoms usually are isomerized at the lower range of temperatures with the hydrocracking reaction quickly replacing the hydroisomerization reaction as the temperature is increased. For example, cetane containing 16 carbon atoms per molecule can be isomerized at temperatures as low as 325° F. However, at the lower temperatures, the conversion rate of the normal paraffins is comparatively low; thus requiring extended periods of operation for producing the desired yields.

As the temperature of the process is raised, the conversion of normal hydrocarbons rapidly increases, i.e. from about one percent to about 99 percent by weight. However, at the higher temperatures isomerization and cracking of the normal paraffins occurs yielding branched isomers of lower carbon numbers than are obtained at the lower temperatures. In addition, at the higher temperatures, the significance of the dehydrogenation component of the mixed catalyst becomes more important. Thus, it has been found that isomerization of n-hexane at temperatures on the order of 500° F., causes the rate of conversion to drop rapidly due to catalyst aging. Apparently, this deactivation results from a rapid build up of cracked and degradation products produced by side reactions (of the isomer) at these elevated temperatures, thus reducing the availability of the acid sites for contact with the paraffinic hydrocarbons.

This process may operate at pressures from about atmospheric to superatmospheric. Preferably, the pressure is sufficient to maintain the paraffinic hydrocarbons, in the liquid phase at the lower temperatures. In addition, even at temperatures above the critical temperatures of the paraffinic hydrocarbons, high pressure operation is desirable since the selectivity of the mixed catalyst for producing branched chain isomers is substantially improved. Apparently, the higher pressures, e.g. 400 p.s.i.g., reduce the formation of cracked products due to conditions favorable to formation of higher molecular weight compounds.

The amount of hydrogen present during formation of branched chain isomers in accordance with this process is governed by the nature of the paraffinic hydrocarbons being reacted as well as by the nature of the reaction per se. Usually, the molar ratio between hydrogen and the hydrocarbon charge is greater for the lower molecular weight hydrocarbons. In general, the molar ratio between hydrogen and the hydrocarbon may extend from about 1:1 to about 40:1.

Typical conditions of operation for a preferred temperature range between 380° and 500° F. are: contact time of reactant, at least 0.1 second; hydrogen to hydrocarbon ratio of 1:1 to 40:1; atmospheric or superatmospheric pressure.

It is believed that further improved results may be obtained by going to lower temperatures than indicated within the ranges of the subject process (i.e. 300° F. or lower) provided that there is simultaneously an increase in residence time in the reactor and a decrease in the hydrogen to hydrocarbon ratio. It is estimated that the increase in residence time and the decrease in ratio shall be of the order of the factor 10 per 100° F. reduction in temperature.

The invention will be described further in conjunction with the following specific examples but it is to be understood that these are merely for purposes of illustration and are not intended to limit the invention thereto.

The following Examples 1–10 demonstrated the isomerization and cracking of n-hexane using a rare-earth exchanged X-type zeolitic catalyst prepared in the manner as mentioned above.

EXAMPLES 1–4.—REX alone

The reactivity of a very active, fresh REX catalyst ($\alpha > 10,000$)[1] for the conversion of n-hexane was examined. All studies were made with a micro-reactor operating with a continuous stream of n-hexane saturated (70° F.) hydrogen or helium, conversion being determined

[1] Cracking activity is obtained by a standard α-test which is fully described in a letter to the editor entitled, "Superactive Crystalline Aluminosilicate Hydrocarbon Catalysts" by P. B. Weisz and J. N. Miale appearing in "Journal of Catalysis," vol. 4, No. 4, August 1965, pp. 525–529.

usually over a period of up to one hour. Gas flow velocity is such as to give a superficial residence time of 3 seconds based on the acid catalyst (or acid catalyst component when the dual-functional mixture is used). This corresponds to a conventional reactor operation of about 3 LHSV for pure hydrocarbon feed. All work reported was carried out at atmospheric pressure, and is shown in Table I below.

TABLE I.—n-HEXANE CONVERSION OVER REX

[Pretreatment, 30 min.; air at 1,000° F., reactor charge, .05 ml. REX plus .5 ml. Vycor chips]

| Example | Carrier gas | Temp., °F. | Time on stream, min. | Isomerization, percent | Cracking percent |
|---|---|---|---|---|---|
| 1 | Hydrogen | 500 | 10 | 2.3 | 0 |
| 2 | do | 600 | 10 | 10.8 | 10.3 |
| 3 | do | 600 | 35 | 9.4 | 4.7 |
| 4 | do | 600 | 60 | 4.4 | 2.0 |

Table I shows that for REX catalyst noticeable reactivity sets in at about 500° F. with some noticeable isomerization. At 600° F., total conversion attains a level of about 15 to 20%, of which about 40 to 50% is to cracked products and 60 to 50% is to iso-hexanes. This is by far a greater isomerization productivity than could be attained on any conventional acidic amorphous oxide catalyst.

Furthermore, is is found that operating in the presence of hydrogen in place of helium does not make a significant difference in results under these operating conditions.

EXAMPLES 5–10.—Mixture of REX and Pt/Al$_2$O$_3$

The same quantity (.5 ml.) of REX catalyst was now mechanically composited with (.5 ml.) of platinum on alumina which had been steamed to remove the major amount of chlorine. Table II shows the conversion behavior of this mixture, and also with additional, analogous runs using only the Pt-alumina component.

TABLE II.—n-HEXANE CONVERSION OVER MECHANICAL MIXTURE OF REX AND Pt/Al$_2$O$_3$, AND COMPARISON WITH CONVERSION OF EACH COMPONENT ALONE

| Example | Carrier gas | Temp., °F. | Time on stream, min. | Mixture, percent | | REX Alone, percent | | P/Al$_2$O$_3$ alone, percent | |
|---|---|---|---|---|---|---|---|---|---|
| | | | | Isom. | Crack. | Isom. | Crack. | Isom. | Crack. |
| 5 | H$_2$ | 500 | 10 | 44.2 | 0 | ~2 | 0 | | |
| 6 | H$_2$ | 500 | 35 | 44.2 | 0 | | | | |
| 7 | H$_2$ | 500 | 50 | 44.2 | 0 | | | | |
| 8 | H$_2$ | 600 | 10 | 65.4 | 10.6 | ~10 | ~10 | ~9 | ~4 |
| 9 | H$_2$ | 600 | 35 | 61.2 | 6.8 | ~8 | ~5 | ~5 | ~3 |
| 10 | H$_2$ | 600 | 50 | 57.1 | 3.5 | ~5 | ~3 | | |

The addition of the Pt-component has created a high activity at temperatures to obviously below 500° F., with remarkably clean selectivity to only isomerization.

With n-hexane such useful conversion is thus indicated to be achievable at temperatures down to as low as near 400° F.

In the following Examples 11–31 n-hexane, n-pentane and n-butane conversion were evaluated using hydrogen mordenite, both alone and in admixture with a supported dehydrogenation component.

EXAMPLES 11–13.—n-Hexane

By itself, H-mordenite was very reactive for n-hexane conversion at temperatures below 400° F., as can be observed from Table III below (data at 10 minutes on stream).

TABLE III.—CONVERSION OF n-HEXANE OVER H-MORDENITE

[Catalyst 1 ml. H-mordenite, with and without added Pt/Al$_2$O$_3$]

| Example | Temp., °F. | H-mordenite alone, percent | | With mixture, percent | |
|---|---|---|---|---|---|
| | | Isomer. conv. | Cracking conv. | Isomer. conv. | Cracking conv. |
| 11 | 500 | .4 | 99 | 23 | 71 |
| 12 | 450 | .5 | 99 | 62.4 | 13.7 |
| 13 | 400 | .3 | 88 | | |

In comparison to this, the admixture of .25 ml. of Pt/Al$_2$O$_3$ to the same quantity of (1 ml.) H-mordenite resulted in a drastic change in behavior, and an unexpected finding in isomerization seelctivity. While in the case.of REX-catalyst, creation of the dual-functional system created higher activity for conversion, here an unexpected finding in isomerization selectivity. While in the is lower in the presence of the hydrogenation component; however, a large increase in isomerization selectivity is achieved.

With n-hexane, the following additional Examples 14–17, Table IV below, demonstrate the low tempera- 12% isomerization and 15% cracking was obtained over .4 ml. of H-mordenite alone at 400° F.

The unusual reduction of total conversion activity by introduction of Pt is again clearly indicated.

EXAMPLES 21–31.—n-Butane n-Butane conversion to cracked products and isomer was high on H-mordenite at temperatures at about 500° F. It was not significantly effected by operating with hydrogen in place of helium as the carrier gas (at atmospheric pressure), as seen from the following typical run data (Table VI).

TABLE VI.—n-BUTANE CONVERSION OVER H-MORDENITE

[1 ml. catalyst 6 sec. residence time]

| Example | Carrier gas | Temp., °F. | Time on stream, min. | Isom. conv., percent | Crack. conv., percent | C$^3$-prod., percent |
|---|---|---|---|---|---|---|
| 21 | Helium | 500 | 10 | 21.6 | 18.4 | 4.2 |
| 22 | do | 500 | 25 | 18.0 | 13.7 | 3.9 |
| 23 | do | 500 | 40 | 15.3 | 11.10 | 3.3 |
| Regenerated | | | | | | |
| 21 | Hydrogen | 500 | 10 | 20.7 | 19.2 | 4.5 |
| 22 | do | 500 | 25 | 15.8 | 12.1 | 2.6 |
| 23 | do | 500 | 40 | 13.3 | 9.1 | 2.1 | ture selective capabilities for isomerization by the dual-functional system using H-mordenite.

TABLE IV.—LOW TEMPERATURE D.F. ISOMERIZATION OF n-HEXANE WITH H-MORDENITE PLUS Pt-COMPONENT

[.5 ml. H-M, .5 ml. Pt/Al$_2$O$_3$]

| Example | Temp., °F. | Time on stream, min. | Isomer. conv., percent | Cracking conv., percent |
|---|---|---|---|---|
| 14 | 500 | 10 | 50.3 | 20.5 |
| 15 | 500 | 35 | 44.8 | 8.3 |
| 16 | 500 | 60 | 35.6 | 8.7 |
| Regenerated | | | | |
| 14 | 400 | 10 | 10.7 | 0 |
| 15 | 400 | 35 | 12.0 | 0 |
| 16 | 450 | 57 | 47.7 | 1.1 |
| 17 | 450 | 82 | 52.1 | 2.3 |

Excellent selective isomerization activity of H-mordenite in a dual-functional reaction system appears to be indicated, with the regenerated catalyst showing even higher selectivity. This is particularly the case when reaction contact conditions, and especially temperature is adjusted to give not much in excess of about 50% single-pass conversion.

EXAMPLES 18–20.—n-Pentane n-Pentane conversion was compared on H-mordenite alone, in admixture with Pt-alumina, and with the Pt-alumina separate and ahead of the H-mordenite bed; all at 450° F. (1 ml. H-mordenite, .25 ml. Pt/Al$_2$O$_3$, admixed or ahead.) Data is tabulated in Table V below.

TABLE V.—n-PENTANE CONVERSION, 450° F.

| Example | Catalyst | Isomer. conv., percent | Cracking conv., percent | Total conv., percent |
|---|---|---|---|---|
| 18 | H-mordenite | 5.3 | 91.0 | 96.3 |
| 19 | Mix | 51.1 | 1.5 | 52.6 |
| 20 | Pt ahead | 7.9 | 65 | 72.9 |

The outstanding ability of the mixed dual-functional system for selective n-pentane isomerization is indicated. In ability to achieve comparable selectivity on H-mordenite alone is indicated by the independent observation that Table VII shows results obtained after admixture of 1 ml. of Pt-alumina.

TABLE VII.—n-BUTANE CONVERSION OVER H-MORDENITE/PT-ALUMINA MIXTURE

[1 ml. of each catalyst, hydrogen stream]

| Example | Temp., °F. | Time on stream, min. | Isomer. conv., percent | Cracking conv., percent |
|---|---|---|---|---|
| 24 | 500 | 10 | 0 | 0 |
| 25 | 600 | 30 | 7.4 | 3.2 |
| 26 | 600 | 35 | 8.6 | 4.3 |
| 27 | 700 | 45 | 12.3 | 32.9 |
| 28 | 700 | 55 | 13.9 | 29.1 |

The high activity of H-mordenite along is severely quenched by the addition of the platinum component, requiring almost 200 degrees higher temperature for equivalent total conversion. The isomerization/cracking selectively furthermore is not as good as in the case of the mono-functional acid catalyst alone.

Clearly the great advantage discovered for the dual-functional conversions of paraffins and described above is not relized for all paraffins, but is specifically limited to hydrocarbons with five or more carbon atoms.

What is claimed is:

1. A process for selective hydroisomerization of hydrocarbons selected from the group consisting of saturated aliphatic hydrocarbons containing 5 to 8 carbon atoms which comprises contacting the same at a temperature between about 300° and about 600° F. with hydrogen and a catalyst composite comprising hydrogen mordenite as the acidic component and platinum as the dehydrogenation component supported on an alumina carrier in intimate physical admixture.

2. A process according to claim 1 wherein said hydrocarbon is n-pentane.

3. A process according to claim 1 wherein said hydrocarbon is n-hexane.

References Cited

UNITED STATES PATENTS

| | | | |
|---|---|---|---|
| 2,428,692 | 10/1947 | Voorhies | 208—112 |
| 3,259,564 | 7/1966 | Kimberlin | 208—111 |
| 3,304,254 | 2/1967 | Eastwood | 208—111 |
| 3,370,099 | 2/1968 | Plank | 260—666 |
| 3,236,903 | 2/1966 | Milton | 260—666 |
| 3,299,153 | 1/1967 | Adams et al. | 260—666 |

DELBERT E. GANTZ, *Primary Examiner.*

V. O'KEEFE, *Assistant Examiner.*

U.S. Cl. X.R.

260—666

UNITED STATES PATENT OFFICE
CERTIFICATE OF CORRECTION

Patent No. 3,432,568                          March 11, 1969

Joseph N. Miale et al.

It is certified that error appears in the above identified patent and that said Letters Patent are hereby corrected as shown below:

Column 2, line 60, "tool" should read -- to 1 --. Column 6, line 15, "11" should read -- 1 --. Column 7, cancel the first paragraph and insert -- In comparison to this, the admixture of .25 ml. of $Pt/Al_2O_3$ to the same quantity of (1 ml) H-mordenite resulted in a drastic change in behavior, and an unexpected finding in isomerization selectivity. While in the case of REX-catalyst, creation of the dual-functional system created higher activity for conversion, here an unexpected and contrary effect was found: The total reactivity is lower in the presence of the hydrogenation component; however, a large increase in isomerization selectivity is achieved. --. Column 8, Table VI, last heading "$C^3$" should read -- $C^5$ --; line 53, "along" should read -- alone --; line 54, "platium" should read -- platinum --; line 61, "relized" should read -- realized --.

Signed and sealed this 26th day of May 1970.

(SEAL)
Attest:

EDWARD M. FLETCHER, JR.                  WILLIAM E. SCHUYLER, JR.
Attesting Officer                          Commissioner of Patents